(No Model.)
W. DEMUTH.
CELLULOID MOUTH PIECE OR BIT FOR CIGAR AND CIGARETTE HOLDERS AND PIPES.
No. 266,582. Patented Oct. 24, 1882.
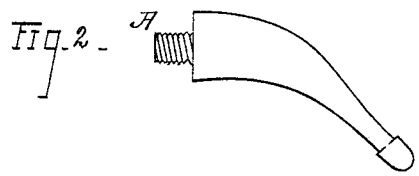
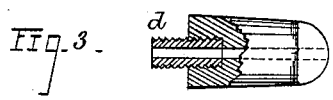
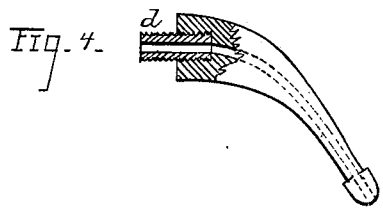
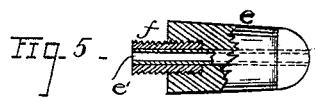
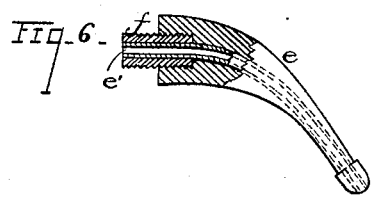
Witnesses;
Chas. C. Gill
Herman Gustow
Inventor;
William Demuth,
By his Attorney.
Rowland Cox

UNITED STATES PATENT OFFICE.

WILLIAM DEMUTH, OF NEW YORK, N. Y.

CELLULOID MOUTH-PIECE OR BIT FOR CIGAR AND CIGARETTE HOLDERS AND PIPES.

SPECIFICATION forming part of Letters Patent No. 266,582, dated October 24, 1882.

Application filed July 1, 1882. (No model.)

*To all whom it may concern:*

Be it known that I, WILLIAM DEMUTH, of New York, in the county of New York and State of New York, have invented a new and useful Improvement in Celluloid Mouth-Pieces or Bits for Cigar and Cigarette Holders and Pipes, of which the following is a specification, reference being had to the accompanying drawings.

The invention has relation to improvements in mouth-pieces or bits, and especially that class of mouth-pieces or bits which are used in connection with pipes and cigar and cigarette holders and pipe-stems.

The invention consists in making the mouth-piece or bit of celluloid or other pyroxyline material, and in providing certain means (of a stronger material) of effecting an attachment to the stem or body of the pipe or holder, and of protecting the celluloid or analogous material from injury by the action of the nicotine, which is necessarily drawn into the mouth-piece or lodged at the point of connection with the stem or body. The details of construction are fully set forth hereinafter.

In the accompanying drawings, Figure 1 represents the mouth-piece or bit of a cigar-holder, and Fig. 2 a mouth-piece or bit of a pipe of corresponding nature.

In the production of the device shown in Fig. 1 the entire article is formed in a single piece in a mold or die of proper configuration, the screw A being molded with the other parts of the article, so that the entire mouth-piece or bit is completed in a single operation, and may be secured in place by screwing it into the pipe, or into the socket provided in the stem of the pipe or body of the cigar-holder, as the case may be.

The device shown in Fig. 2, which is a curved mouth-piece or bit, may be formed in a mold or die, or may be first molded straight and then bent upon a form or otherwise.

In Figs. 3 and 4 are shown illustrations of the invention, the devices shown in which are the same as those shown in Figs. 1 and 2, except that the mouth-piece or bit is provided in each instance with separable screws $d$, which are used to connect the mouth-piece or bits with the pipe, or the stem of the pipe or body of the holder. The screw $d$ will be of sufficient length and of suitable material to hold the mouth-piece or bit in place and to prevent a fracture of that part of it which is nearest the stem. I have been accustomed to employ a screw made of bone, which is a desirable material and may be used with satisfactory results. Figs. 5 and 6 are modified forms of the mouth-piece or bit, in which $e$ is the pyroxyline material; $f$, a screw similar to the screw $d$, hereinbefore described, and $e'$ a tube, preferably of metal, which corresponds in size with the hole of the mouth-piece or bit, all as shown in the two figures last referred to.

In manufacturing the bent or curved mouth-piece or bit shown in Fig. 6, I have been accustomed to form the mouth-piece straight and bend the mouth-piece or bit, with the tube inserted, to the form desired in any convenient way. Where the screw is employed it may be successfully used, in connection with the tube, to strengthen the material at the point of connection of the stem, as will be understood by persons familiar with the art to which the invention has relation.

It is plain that, if desired, the tube may be used in connection with a bit made entirely of pyroxyline material—that is to say, a bit constructed like that shown in Fig. 1, and hereinbefore described.

What I claim as my invention, and desire to secure by Letters Patent, is—

1. As a new article of manufacture, a mouth-piece or bit for pipes and cigar and cigarette holders, consisting of celluloid or other pyroxyline material, substantially as set forth.

2. As a new article of manufacture, a mouth-piece or bit the body of which consists of celluloid or other pyroxyline material provided with a separable attaching-screw, substantially as set forth.

3. The combination, in a mouth-piece or bit, of a body consisting of celluloid or other pyroxyline material, a tube, $e'$, and screw $f$, substantially as described.

In testimony that I claim the foregoing improvement in mouth-pieces or bits for cigar and cigarette holders and pipes, as above described, I have hereunto set my hand this 21st day of June, 1882.

WILLIAM DEMUTH.

Witnesses:
L. P. HEMPSTEAD,
W. M. JONES.